US008406303B2

(12) United States Patent
Hoffman et al.

(10) Patent No.: US 8,406,303 B2
(45) Date of Patent: Mar. 26, 2013

(54) MOTION ESTIMATION USING PREDICTION GUIDED DECIMATED SEARCH

(75) Inventors: Marc Hoffman, Mansfield, MA (US); Wei Zhang, Millis, MA (US); Raka Singh, Bangalore (IN); Ke Ning, Framingham, MA (US)

(73) Assignee: Analog Devices, Inc., Norwood, MA (US)

(*) Notice: Subject to any disclaimer, the term of this patent is extended or adjusted under 35 U.S.C. 154(b) by 1480 days.

(21) Appl. No.: 11/638,838

(22) Filed: Dec. 14, 2006

(65) Prior Publication Data
US 2007/0183504 A1 Aug. 9, 2007

Related U.S. Application Data

(60) Provisional application No. 60/750,578, filed on Dec. 15, 2005.

(51) Int. Cl.
*H04N 11/04* (2006.01)
(52) U.S. Cl. ......... 375/240.16; 375/240.17; 375/240.24
(58) Field of Classification Search ............ 375/240.16, 375/240.17, 240.24
See application file for complete search history.

(56) References Cited

U.S. PATENT DOCUMENTS

| | | | | | |
|---|---|---|---|---|---|
| 6,014,181 | A | * | 1/2000 | Sun | 348/699 |
| 6,859,494 | B2 | * | 2/2005 | Panusopone et al. | 375/240.16 |
| 6,876,703 | B2 | * | 4/2005 | Ismaeil et al. | 375/240.16 |
| 7,280,597 | B2 | * | 10/2007 | Zhang et al. | 375/240.16 |
| 2002/0025001 | A1 | | 2/2002 | Ismaeil et al. | |
| 2005/0105620 | A1 | | 5/2005 | Fukushima | |
| 2007/0076795 | A1 | * | 4/2007 | Lee | 375/240.16 |

FOREIGN PATENT DOCUMENTS

| | | |
|---|---|---|
| JP | 1066083 | 3/1989 |
| JP | 11239354 | 8/1999 |

OTHER PUBLICATIONS

Junavit Chalidabhongse et al., "Fast Motion Vector Estimation Using Multiresolutin-Spatio-Temporal Correlations", IEEE Transactions on Circuits and Systems for Video Technology, IEEE Servide Center, Piscataway NJ,, vol. 7, No. 3, line 1997, pp. 480-484.*
Aroh Barjatya, "Block Matching Algorithms for Motion Estimation", Digital Image Processing, [Online], Apr. 26, 2004, Utah State Univesity, URL: http://www.mathworks.com/matlabcentral/fileexchange/loadFile.do?objectId=8761&objectType=File.
Junavit Chalidabhongse et al., "Fast Motion Vector Estimation Using Multiresolutin-Spatio-Temporal Correlations", IEEE Transactions on Circuits and Systems for Video Technology, IEEE Service Center, Piscataway, NJ, vol. 7, No. 3, line 1997, pp. 480-484.
Search Report and Written Opinion dated May 29, 2007 from International Application No. PCT/US2006/047641.
Examination Report in Japanese Patent Application No. 2008-545790, mailed Nov. 22, 2011 (translation) 3 pages.
Kossentini et al., "Predictive RD Optimized Motion Estimation for Very Low Bit-Rate Video Coding," IEEE Journal on Selected Areas in Communications, IEEE vol. 15, No. 9, pp. 1752-1763 (1997).
Examination Report for European Patent Application No. 06845377.8, mailed Nov. 5, 2009, 4 pages.

* cited by examiner

*Primary Examiner* — Justin Rider
(74) *Attorney, Agent, or Firm* — Bingham McCutchen LLP

(57) ABSTRACT

A method and apparatus utilizing a prediction guided decimated search motion estimation algorithm are provided. The prediction guided decimated search motion estimation algorithm generates a motion vector used to encode a macroblock in a frame from a video sequence. The algorithm includes generating full-pixel seed vectors, performing a full-pixel search around the generated seed vectors, which is followed by a fractional pixel search. The full-pixel seed vectors generated are a predicted motion vector and a hierarchical motion vector. A fractional pixel search may be conducted around a final motion vector generated by the full-pixel search and may include a half-pixel search and a quarter-pixel search. The prediction guided decimated search motion estimation algorithm can be implemented in both software and hardware. The algorithm is characterized by improved efficiency, scalability, and decreased complexity.

30 Claims, 10 Drawing Sheets

MOTION ESTIMATION USING PREDICTION GUIDED DECIMATED SEARCH

CROSS-REFERENCE TO RELATED APPLICATION

This application claims priority under 35 U.S.C. §119(e) to U.S. Provisional Application Ser. No. 60/750,578, entitled, "PREDICTION GUIDED DECIMATED SEARCH (PGDS) A LOW COST HIGH PERFORMANCE MOTION ESTIMATION FOR REAL-TIME EMBEDDED SYSTEM," filed on Dec. 15, 2005, which is hereby incorporated by reference in its entirety.

FIELD OF THE INVENTION

The invention relates generally to motion estimation in a video sequence and, more particularly, to a method and apparatus utilizing a prediction guided decimated search motion estimation algorithm.

BACKGROUND OF THE INVENTION

High quality and low bit-rate videos are widely used in telecommunication, entertainment, broadcasting, surveillance, digital camera, and military applications. Increasing number of video products, such as DVD players, digital TV, personal video recorders, multimedia jukeboxes, video-capable cell phones, to name a few, rely on video compression to reduce the number of bits required to store and/or transmit a video sequence.

A video sequence consists of a series of frames. To improve video data compression efficiency, motion estimation may be performed. Motion estimation has proven to be effective in exploiting temporal redundancy of a video sequence by extracting correlation between adjacent frames. In a sequence of frames, a current frame is predicted from a previous frame known as a reference frame. The current frame is usually divided into blocks or macroblocks. The size of the macroblocks is typically 16×16 pixels, but may vary, depending on a standard. Each macroblock in the current frame is compared to regions of the same size, which can also be referred to as macroblocks, in the reference frame in an attempt to locate the best matching macroblock, using some error criteria, such as, for example, a sum of absolute differences (SAD), a minimum squared error (MSE), or a mean absolute error (MAE).

To minimize computational costs, motion estimation may be conducted over a predetermined search area within the reference frame. A vector denoting the displacement of the best matching macroblock in the reference frame with respect to the macroblock in the current frame, is determined. This vector is referred to as a motion vector. Motion vectors are typically used to compress video sequences by encoding the changes to an image from one frame to the next rather than the entire frame.

To satisfy the high demand for visual communication applications, many video compression standards have been developed. Motion estimation is a central part of many video compression schemes, such as, for example, ISO/IEC MPEG-1, MPEG-2, MPEG-4, CCITT H.261, ITU-T H.263, ITU-T H.264, and Microsoft WMV9/VC-1. Motion estimation can also be used in other applications besides video compression, such as, for instance, image stabilization, computer vision, motion segmentation, and video analysis.

A typical motion estimation module in a video encoding system is usually the most computationally intensive component and is responsible for about 50-60%, in some cases up to 80%, of the total cost in terms of computation time and power. Although much work has been done to develop efficient motion estimation algorithms, most prior work targets very-large-scale integration (VLSI) systems, and is not software friendly. The hardware-oriented algorithms do not provide sufficient flexibility and require additional resources. A strict software implementation of these algorithms may not achieve the same level of efficiency. In development of many motion estimation algorithms, the number of computational operations is used for measurement of their computational complexity. Very few algorithms have been developed that optimize both computational performance and memory access bandwidth, which are significant constraints for a resource-limited embedded system.

SUMMARY OF THE INVENTION

In view of the foregoing, the present invention provides a method for a motion estimation using a Prediction Guided Decimated Search (PGDS) motion estimation algorithm which can be implemented in both software and hardware. The algorithm is characterized by improved efficiency, scalability, and decreased complexity, as will be shown below. Moreover, implementing the algorithm in software makes it flexible and adaptable to new standards and changing functional requirements.

In embodiments of the invention, the PGDS algorithm includes generating full-pixel seed vectors, performing a full-pixel search around the generated seed vectors, which is followed by a fractional pixel search. In order to initiate the full-pixel search, it is desirable to provide starting point(s) that can guide the search for a final motion vector. Utilizing the starting points, or seeds, may speed up the search. Accordingly, two full-pixel search seeds are generated—a predicted motion vector (PMV) and a hierarchical motion vector (HMV). The PVM is derived from motion vectors of neighboring macroblocks and is a Sum-of-Absolute-Difference (SAD)-weighted median motion vector. The HMV is a motion vector generated from a decimated current macroblock and an analogously decimated reference frame, using a spiral search around a diamond pattern. A decision module may be employed to decide whether the full-pixel search will be conducted using the PVM, HVM, or both. Therefore, the decision is made based on the current context and historical data. The number of search points evaluated by the full-pixel search, i.e., the number of candidate motion vectors to be examined, may also be provided by the decision module. A fractional pixel search may be conducted around a final motion vector generated by the full-pixel search and may include a half-pixel search and a quarter-pixel search. In embodiments of the invention, a half-pixel square search around a full-pixel motion vector and a quarter-pixel diamond search around a half-pixel motion vector provide sufficient resolution. The fractional pixel search provides additional accuracy to suppress motion compensation errors.

Accordingly, a number of aspects of the invention are presented, along with a number of exemplary embodiments, which are not intended as limiting.

One such aspect is a method for motion estimation in a video sequence. The method comprises generating a predicted seed motion vector encoded using a predicted seed motion vector encoding cost; generating a hierarchical seed motion vector encoded using a hierarchical seed motion vector encoding cost; selecting said predicted seed motion vector, said hierarchical seed motion vector, or both, based on a comparison of said predicted seed motion vector encoding cost and said hierarchical seed motion vector encoding cost for a full-pixel search; performing said full-pixel search on each said selected seed motion vector to select a full-pixel motion vector based on an encoding cost of said full-pixel motion vector; and performing a fractional pixel search using said selected full-pixel motion vector to estimate a final motion vector.

According to another aspect, a computer-readable storage medium is provided. The computer-readable storage medium is encoded with computer instructions for execution on a computer system, the instructions, when executed, performing a method for motion estimation in a video sequence, comprising generating a predicted seed motion vector encoded using a predicted seed motion vector encoding cost; generating a hierarchical seed motion vector encoded using a hierarchical seed motion vector encoding cost; selecting said predicted seed motion vector, said hierarchical seed motion vector, or both, based on a comparison of said predicted seed motion vector encoding cost and said hierarchical seed motion vector encoding cost for a full-pixel search; performing said full-pixel search on each said selected seed motion vector to select a full-pixel motion vector based on an encoding cost of said full-pixel motion vector; and performing a fractional pixel search using said selected full-pixel motion vector to estimate a final motion vector.

According to another aspect, an apparatus comprising a processor and a computer-readable storage medium containing computer instructions for execution on the processor to provide a method for a motion estimation in a video sequence, comprising generating a predicted seed motion vector encoded using a predicted seed motion vector encoding cost; generating a hierarchical seed motion vector encoded using a hierarchical seed motion vector encoding cost; selecting said predicted seed motion vector, said hierarchical seed motion vector, or both, based on a comparison of said predicted seed motion vector encoding cost and said hierarchical seed motion vector encoding cost for a full-pixel search; performing said full-pixel search on each said selected seed motion vector to select a full-pixel motion vector based on an encoding cost of said full-pixel motion vector; and performing a fractional pixel search using said selected full-pixel motion vector to estimate a final motion vector.

In some embodiments, the final motion vector may be estimated for an input macroblock within a current video frame from said video sequence. The final motion vector may be estimated within a search window of a configurable size.

The predicted seed motion vector may be generated using previously estimated motion vectors for neighboring macroblocks. The hierarchical seed vector may be generated using a hierarchical search.

In some embodiments, generating said hierarchical seed vector may include decimating the input macroblock using a predetermined decimation factor and decimating a reference frame from the video sequence using the predetermined decimation factor.

In some embodiments, the full-pixel search may be performed using the selected hierarchical seed motion vector and/or said selected predicted seed motion vector, and a number of full-pixel search locations is configurable.

In some embodiments, the full pixel search may be a square search. The fractional pixel search may be include at least one half-pixel square search and at least one quarter-pixel diamond search.

It should be understood that the embodiments above-mentioned and discussed below are not, unless context indicates otherwise, intended to be mutually exclusive.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
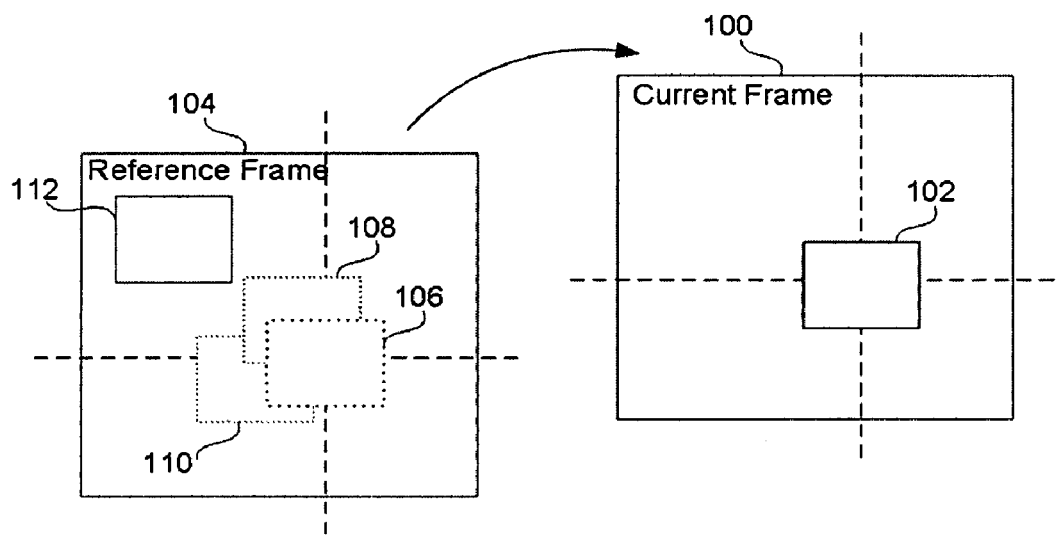
FIG. 1A is a schematic diagram of motion estimation performed to estimate a motion vector.
Figure 1B:
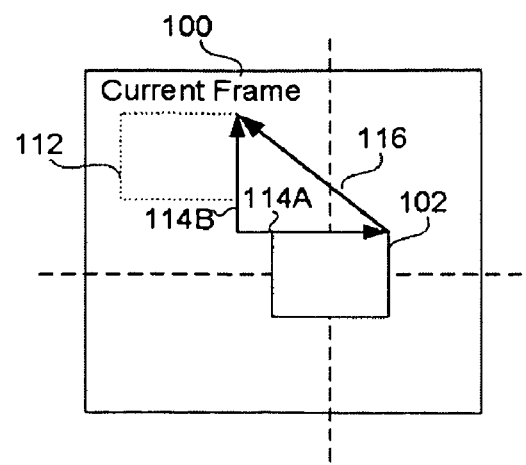
FIG. 1B is a schematic diagram showing a motion vector used to encode a macroblock in a current frame.

FIG. 1A is a schematic diagram illustrating a motion estimation performed to estimate a motion vector. A macroblock 102 within a current frame 100 is compared to macroblocks in a reference frame 104. Typically, the macroblock 102 is first compared to a co-located macroblock 106 in the reference frame 102, after which the co-located macroblock 106 is shifted to other locations in the reference frame, for example, as shown at locations 108 and 110. The shift may be of variable size and its direction depends on a search pattern used and parameters of a search algorithm. When a macroblock 112 best matching macroblock 104 is found in the reference frame 104, a displacement between macroblocks 102 and 112, which constitutes a motion vector 116, is determined, as shown in FIG. 1B. The motion vector 116 includes a horizontal (x) component 114A and a vertical (y) component 114B. Consequently, the macroblock 102 from the current frame 100 is encoded as the motion vector 116, relative to the best matching macroblock 112 in the reference frame 104. The encoding of the macroblock 102 is schematically shown in FIG. 1B, where the best matching macroblock 112 is shown for the convenience of representation.

Figure 2:
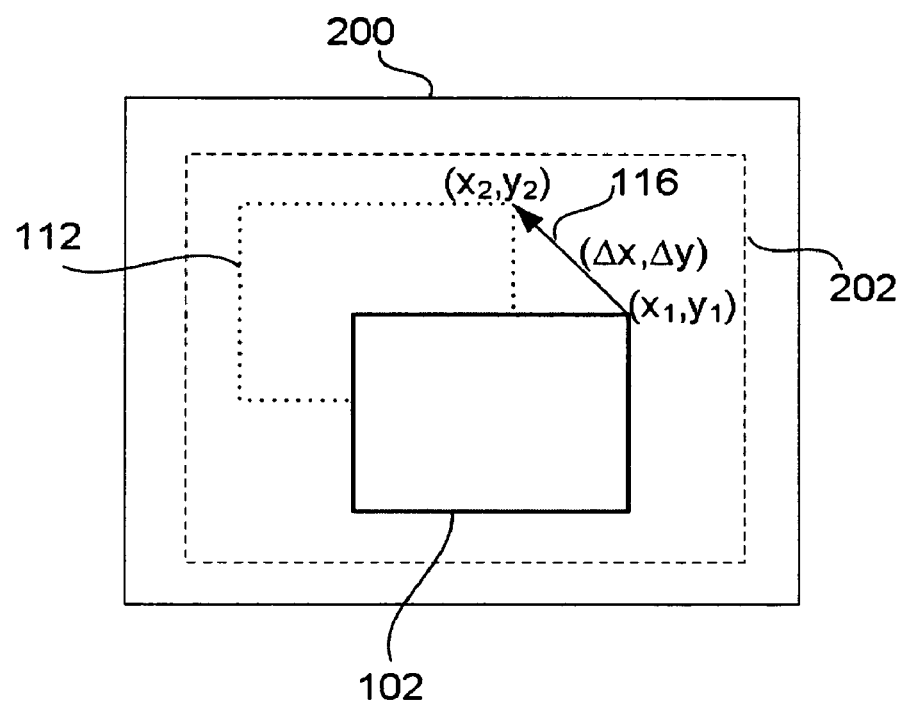
FIG. 2 is a schematic diagram showing in more detail the motion vector of FIG. 1B used to encode the macroblock in the current frame.

FIG. 2 is a schematic diagram illustrating in more detail the motion vector shown in FIG. 1. FIG. 2 shows a reference frame 200 and a search window 202 which delimits an area of the search. The size of the search window may vary. In addition, FIG. 2 demonstrates that, if the macroblock 102, having, as an example, a top right position $(x_1, y_1)$, is displaced relative to the best matching macroblock 112, having, as an example, a top right position $(x_2, y_2)$, the motion vector 116 can be represented as $(\Delta x, \Delta y)$, where $\Delta x$ and $\Delta y$ are horizontal and vertical displacements, respectively. Otherwise, if no motion is detected and the best matching macroblock 112 is found at the same location in the reference frame as the macroblock 102 in the current frame (not shown), the corresponding motion vector 116 can be denoted as (0,0).

Figure 3:
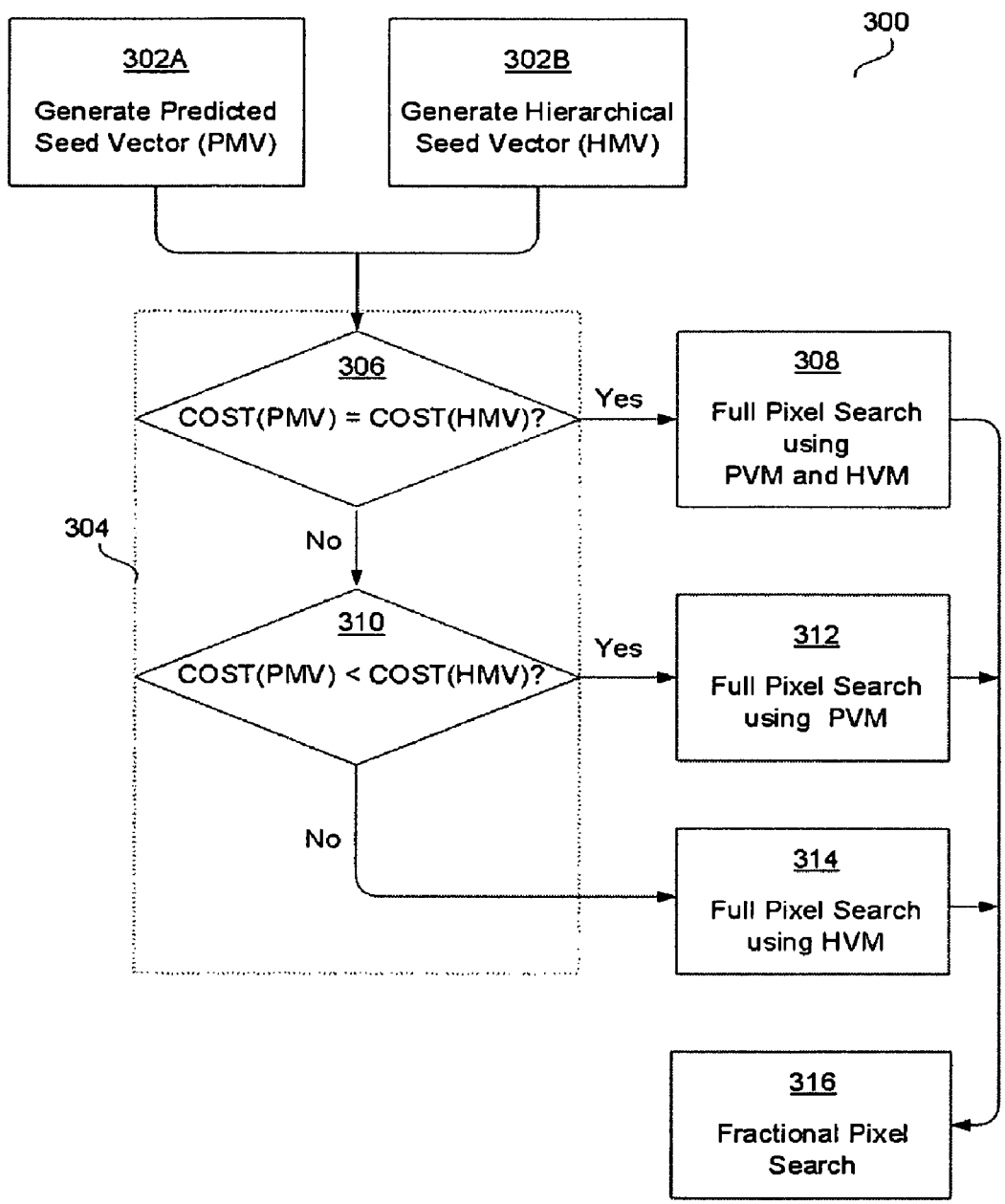
FIG. 3 is a flowchart showing a prediction guided decimated search (PGDS) algorithm.

Referring to FIG. 3, steps of a prediction guided decimated search (PGDS) algorithm 300 employed in embodiments of the present invention are shown. This algorithm relies on generating, in steps 302A and 302B, two types of seed vectors to initiate the search for a motion vector. The seed vectors are used to conduct a subsequent search, following a predetermined pattern.

One of the seed vectors is referred to as a predicted motion vector (PMV), generated in step 302A. PMV is a SAD-weighted median motion vector, estimated from motion vectors of neighboring macroblocks, as shown in detail in FIG. 4. The motion vectors previously estimated for three neighboring macroblocks of a current macroblock 400, are used in embodiments of the invention to predict PMV for the current macroblock 400. If the current macroblock 400 is denoted as $MB(n_x, n_y)$, then the three spatial neighboring macroblocks used are a macroblock 402 on the left ($MB(n_x, n_{y-1})$), a macroblock 404 directly above ($MB(n_{y-1}, n_x)$), and a macroblock 406 on the upper right ($MB(n_{x-1}, n_{y+1})$). The use of the neighboring macroblocks is based on an assumption that, if motion occurs, macroblocks encompassing the same object move together.

An adaptive cost threshold is used to assess whether each candidate macroblock (of the three above-described neighboring macroblocks), if available, qualifies to be used for the PMV prediction, based on a cost of a motion vector used to encode it, and a SAD value. The adaptive threshold may be an average running cost for the candidate macroblock and is defined a $$\text{avg\_cost} = \frac{1}{mbno} \sum_{m=0, n=0}^{m=i, n=j-1} \text{COST}(m, n), \quad (1)$$

where $$mbno = \frac{(i*W)}{256} + j,$$

W is a width of the search frame, (i,j) is a position of the current macroblock, N is the number of pixels in the macroblock (256 for a 16×16 pixels macroblock), and COST(m,n) is the cost function, which includes the SAD and the motion vector encoding cost. The cost function can be defined as $$\text{COST}(m,n) = \text{SAD}(m,n) + \text{MV\_COST}(mv_x, mv_y) \quad (2)$$

and SAD is defined as $$SAD = \sum_{i=0}^{M-1} \sum_{j=0}^{N-1} |C(i, j) - R(i, j)|, \quad (3)$$

where C is the current macroblock, R is a reference macroblock, and M×N is a dimension of the current and reference macroblocks (for example, 16×16 pixels, as in some embodiments). The motion vector encoding cost, $\text{MV\_COST}(mv_x, mv_y)$, is the number of bits required to encode a motion vector for the current macroblock. It should be appreciated that the adaptive threshold may be defined by using various other suitable methods. In video encoding, the SAD value is a standard criterion used to represent a pixel-by-pixel difference between pixel intensity values of a macroblock in the current frame and pixel intensity values of a macroblock of the same size in the reference frame.

Figure 4:
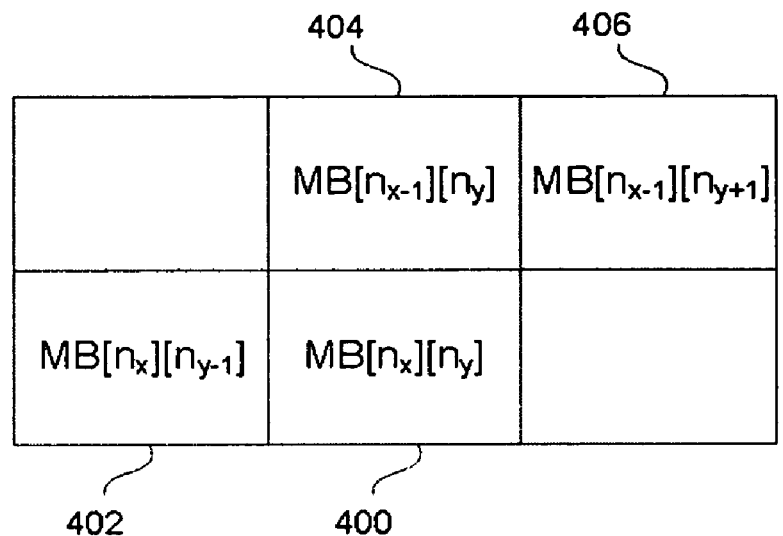
FIG. 4 is a schematic diagram showing a current macroblock and its neighboring macroblocks exploited to generate a prediction motion vector (PMV) seed for the current macroblock.
Figure 5:
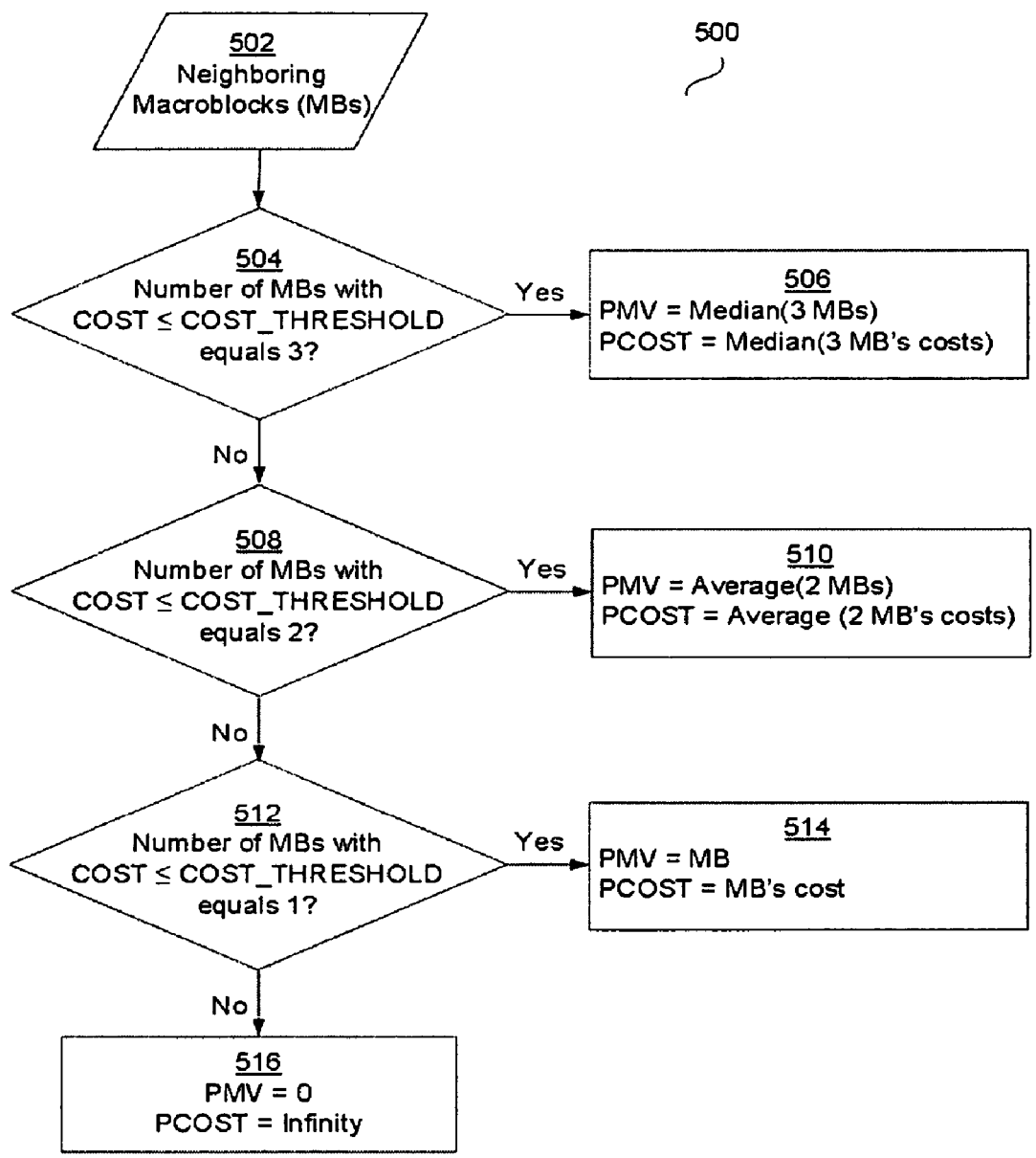
FIG. 5 is a flowchart of a process of predicting the PMV seed vector and predicting a cost of encoding the PMV seed vector.

FIG. 5 is a flowchart that illustrates prediction of the PMV seed vector for a macroblock using the neighboring macroblocks, according to embodiments of the invention. The prediction depends on the availability of candidate neighboring macroblocks 502 characterized by an encoding cost lower than the adaptive threshold COST_THRESHOLD. For each of the available candidate macroblocks, a motion vector is assumed to be previously estimated and a corresponding encoding cost is assumed to be previously determined, as defined in Eq.(2). Accordingly, if all three candidate macroblocks, such as, for example, the macroblocks 402, 404, and 406 shown in FIG. 4, are characterized by costs lower than the adaptive threshold, which is determined in step 504, PMV is defined as a median value of the three corresponding motion vectors, as shown in step 506. Step 506 also shows that a cost of encoding the current macroblock, PCOST, is defined as a median of costs of encoding the three candidate macroblocks. Further, in step 508, it is decided whether two of the candidate macroblocks are valid for the prediction, and, if the answer is affirmative, the average value of their motion vectors is used, in step 510. Analogously, PCOST is defined as the average value of respective costs used to encode the two candidate macroblocks. Otherwise, step 512 determines whether only one candidate macroblock is characterized by a cost not exceeding the threshold, and, if this is the case, a motion vector estimated previously for this candidate macroblock is used to define PMV, as shown in step 514. PCOST is defined as a cost used to encode the candidate macroblock. Finally, if none of the examined neighboring candidate macroblocks qualifies to be used in the PMV prediction, PMV is defined as zero, which is shown in step 516. In this case, PCOST is considered infinite. In embodiments of the invention, two or three above-described search steps, where each step comprises examining neighboring macroblocks of a particular macroblock, are performed in order to predict PVM. The number of search steps is configurable.

Figure 6:
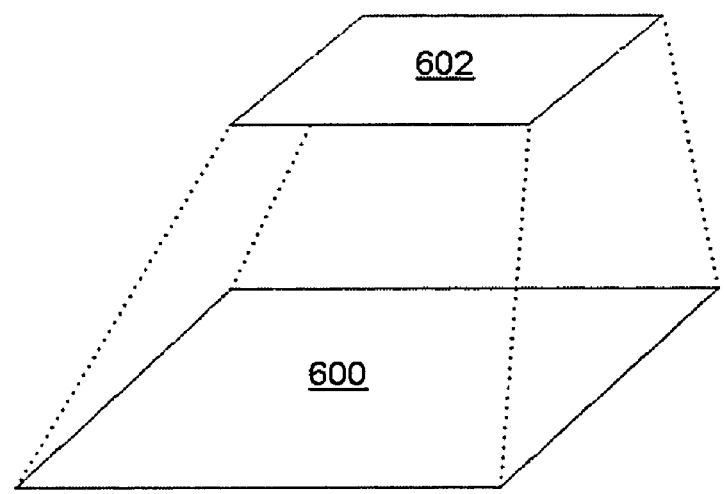
FIG. 6 is a schematic diagram illustrating frame decimation.

Referring again to FIG. 3, a hierarchical seed motion vector (HMV) is generated in step 302B. In order to generate the HMV seed vector, the current macroblock and the reference frame are decimated. The decimation is schematically illustrated in FIG. 6, which shows an original full resolution frame (or macroblock) 600 and a decimated frame (or macroblock) 602. Different approaches can be taken to decimate a frame, thus decreasing its resolution and speeding up the encoding process. In embodiments of the invention, a "shift by 4" technique is employed, whereby non-overlapping blocks of size 4×4 pixels are condensed into one pixel by averaging the values of the pixels in each of the blocks. Therefore, a macroblock of size 16×16 pixels is decimated into a macroblock of size 4×4 pixels (i.e., a decimation factor is 4). Other suitable decimation factors may also be utilized.

Figure 7:
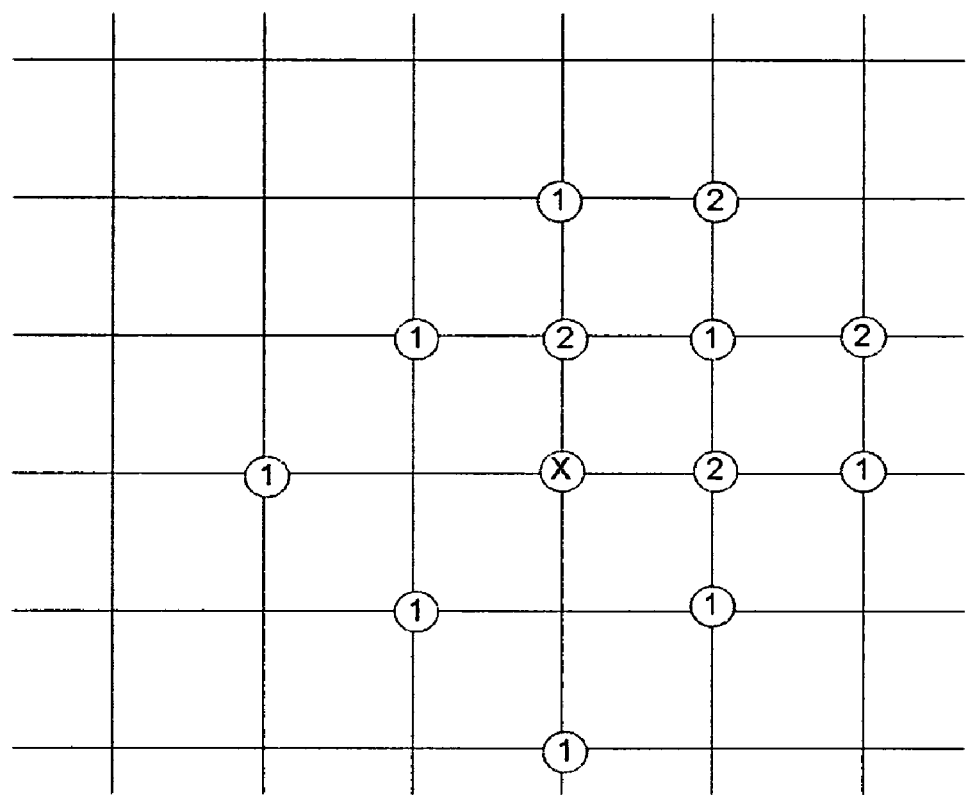
FIG. 7 illustrates a spiral search around a diamond pattern used for motion estimation.

To estimate the HMV seed vector, a motion estimation using a spiral search around a diamond pattern may be performed on the decimated reference frame, an example of which is shown schematically in FIG. 7. In FIG. 7, an X is a starting point for the search, and other points are shown as numbered circles, where the numbers indicate the order of the search steps each grouped into a diamond pattern characterized by a particular step size. When a diamond search pattern such as the one shown in FIG. 7 is utilized, SAD values between the pixel intensities of the current macroblock and pixel intensities of macroblocks in the reference frame, including a SAD value for a macroblock (marked as X) co-located with the macroblock in the current frame, are determined. The co-located macroblock is displaced by a step of a predetermined size.

Encoding costs predicted to be used to encode motion vectors indicating displacements between the current macroblock and each of the examined macroblocks in the reference frame are determined. The encoding costs and associated SAD values may be used to define a cost of encoding the current macroblock using each of the examined macroblocks in the reference frame, as shown in Eq.(2). Thus, in FIG. 7, eight circles numbered as 1, surrounding the starting point (marked as X), comprise a first diamond search pattern. The step size of the diamond search pattern shown by way of example only in FIG. 7 is two, i.e. the macroblock in the reference frame co-located with the current macroblock is displaced by two pixels in both vertical and horizontal directions, thus forming a "diamond". It should be appreciated that search steps of other suitable sizes (for example, eight) may be used.

The next search in the diamond search pattern is performed around a macroblock in the reference frame which, if used to encode the current macroblock, would provide the smallest encoding cost, compared to encoding costs associated with using other examined macroblocks in the reference frame. In FIG. 7, a second set of points numbered as 2 comprises the next diamond search pattern, wherein the step size is decreased to one. At subsequent steps, the search in the diamond pattern may proceed by examining macroblocks in the reference frame around a macroblock chosen as described above (not shown). The number of searches performed in this manner may be variable, and, in some embodiments, may be about ten. The search steps each performed in the above-described diamond pattern follow what may be referred to as a "spiral" search path. Therefore, the search described in connection with FIG. 7 is referred to as the spiral search around a diamond pattern.

As shown in FIG. 3, a decision module 304 determines which of the seed vectors, the PMV seed vector or the HMV seed vector, or both, will be used to perform a full-pixel search. Accordingly, if costs of encoding the PMV seed vector and the HMV seed vector are equal, which is determined in step 306, both of the seeds are used to initiate the fill-pixel search, in step 308. If the cost of the PMV seed vector is lower than that of the HMV seed vector, which is determined in step 310, the PMV seed vector is selected to be the starting point of the full-pixel search, in step 312. Otherwise, the HMV seed vector is utilized, in step 314.

Figure 8:
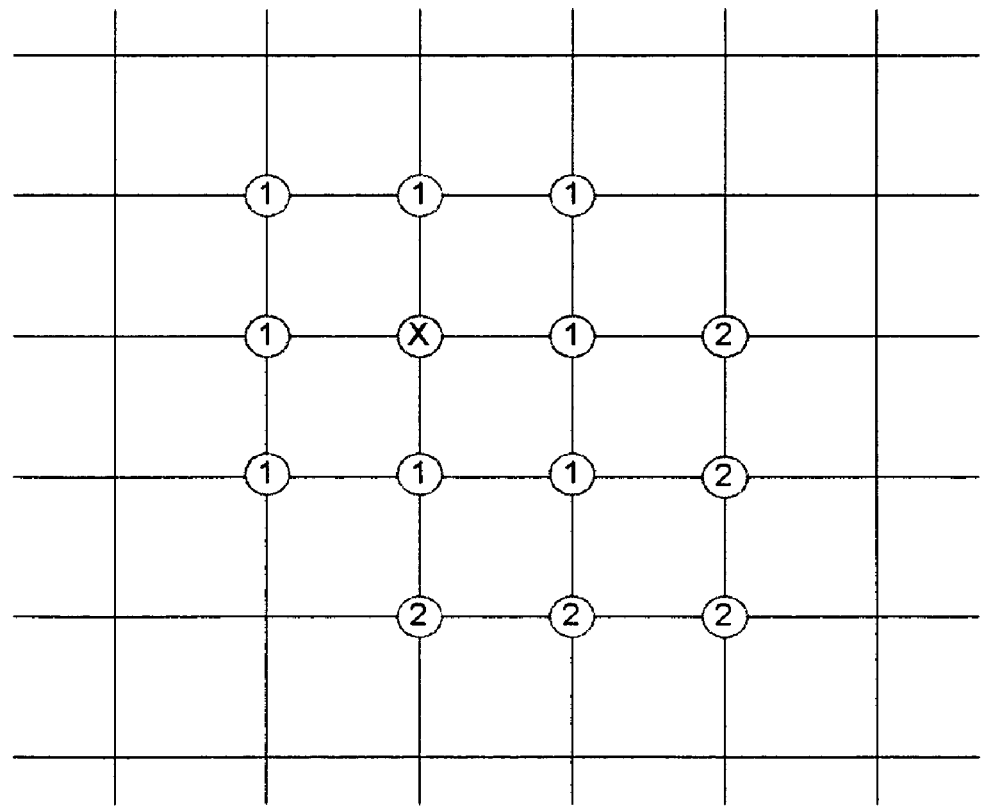
FIG. 8 illustrates a square search pattern used for motion estimation.

In embodiments of the invention, the full-pixel search around a seed vector or two seed vectors is performed in a square search pattern. FIG. 8, illustrates an example of the square search pattern. Accordingly, in FIG. 8, a starting point marked as X indicates a location of a macroblock which was determined to provide a motion vector required a minimum cost to encode the current macroblock, circles marked as 1 show locations of points forming a first square pattern, and circles marked as 2 show locations of points that are evaluated subsequently, also in the square search pattern. A size of the step in the square search pattern shown in FIG. 8 is one. However, it should be appreciated that the size of the step is configurable. The direction of the shift from one square pattern to the next is determined in the same way as described for the diamond search pattern presented in FIG. 7, i.e. towards a macroblock providing a minimum cost required to encode the current macroblock.

As a result of the full-pixel search, a final full-pixel motion vector for the current macroblock is estimated. It should be understood that the full-pixel motion vector represents a displacement between the current macroblock and a macroblock in the reference frame which allows encoding the current macroblock using the lowest encoding cost. If the full-pixel search is performed using both PMV and HMV seed vectors, the square search described in FIG. 8 may be conducted around each of the seed vectors and the final full-pixel motion vector is selected among two full-pixel motion vectors resulting from two respective searches, using the encoding cost criterion described above.

In embodiments of the invention, up to three full-pixel square pattern searches around a seed vector are performed. The predetermined number of searches, as well as the step size, can be tuned to adapt to the quality and complexity requirements of a video encoder. It should be understood that the full-pixel search is performed on pixels having integer-valued coordinates, while sub-pixel searches, such as, for instance, half-pixel or quarter-pel, are conducted on interpolated pixel values, corresponding to fractional-valued coordinates.

Figure 9:
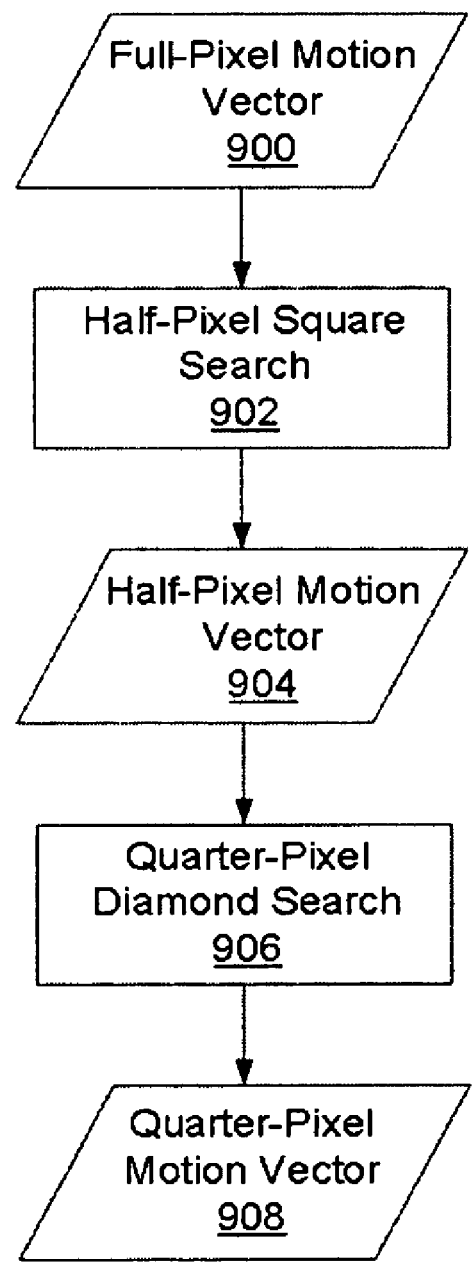
FIG. 9 is a flowchart showing steps of a fractional pixel search around a full-pixel motion vector.
Figure 10:
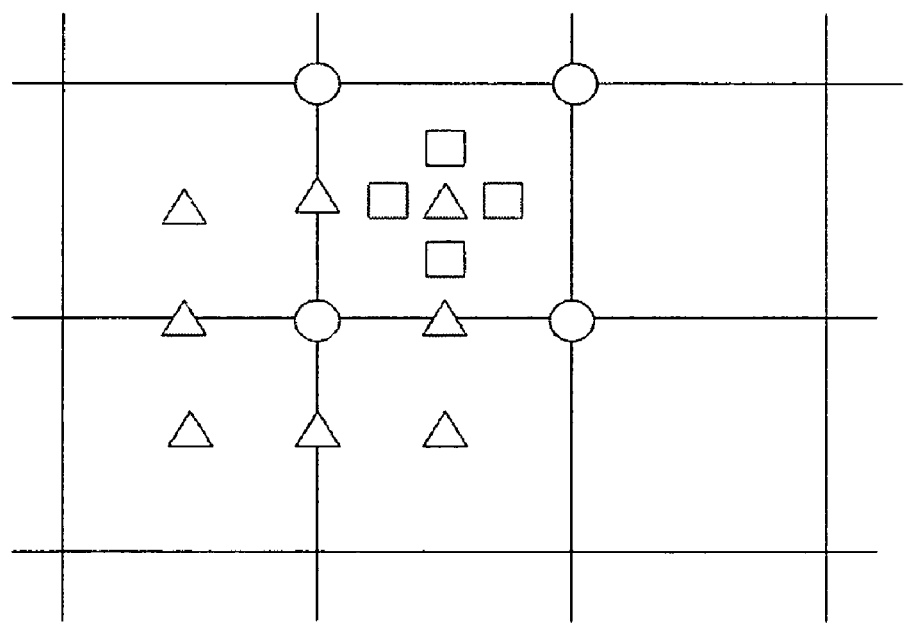
FIG. 10 illustrates locations of half-pixels and quarter-pixels, relative to full-pixels in a fractional pixel search.

Referring to FIG. 9, the final full-pixel motion vector 900 may be used as a starting point for the last step of the PGDS algorithm, a fractional pixel search, as shown in step 316 of FIG. 3. FIG. 10 illustrates generally pixels analyzed by the fractional pixel search, where circles show pixels with integer-valued coordinates, and triangles and squares represent pixels with half- and quarter-pixel valued coordinates, respectively. In embodiments of the invention, a half-pixel square search 902 around the full-pixel motion vector 900 is performed, whereby a search step size is half a pixel in both vertical and horizontal directions from a position of a macroblock best-matching the current macroblock. The value of each half-pixel is interpolated from values of neighboring full-pixels by taking the average of the full-pixels or using any other suitable method. A half-pixel motion vector 904 is obtained using the half-pixel square search 902, after which a quarter-pixel diamond search 906 is performed around the half-pixel motion vector 904. The values of quarter-pixels are interpolated from neighboring half-pixels, by either averaging the half-pixels or by using any other suitable method. It should be appreciated that the square half-pixel and diamond quarter-pixel searches are performed analogously to the respective full-pixel searches described in connection with FIGS. 8 and 7, respectively. The number of times each search is performed is configurable. In embodiments of the invention, each of the square half-pixel search and the diamond quarter-pixel search was performed once. Some video encoding standards, such as, for example, H.264 and MPEG-4, which require fractional interpolation points, benefit in terms of computational cost from undertaking fewer fractional pixel searches.

Tables 1 and 2 show some of the results of performance experiments conducted by the inventors, performed on four known testing clips, such as "foreman," "paris," "mobile," and "tennis." In Table 1, two metrics are used to evaluate a performance of four different motion estimation algorithms, such as Full Search (FS), Two-Dimensional Logarithm Search (TDL), Hierarchical Search (HS), and PGDS (according to embodiments of the invention): an average number of bits used to encode a video sequence and an average Peak Signal-to-Noise Ratio (PSNR). A smaller number of bits and higher PSNR value indicate better performance. Also, a percentage increase in the number of bits and a difference in PSNR, compared to the FS algorithm, is given.

FS is most computationally expensive but provides the best encoding quality and a low bit-rate. For a motion estimation algorithm, the closer the number of bits and PSNR are to those generated by the FS algorithm, the better the performance of the algorithm. Table 1 shows that for low-motion clips, "foreman" and "paris," PGDS, compared to FS, provides only small, less than 1%, increase in the bit-rate, and an almost identical PSNR. For high-motion clips, "mobile" and "tennis," PGDS shows better performance than FS.

Figure 11:
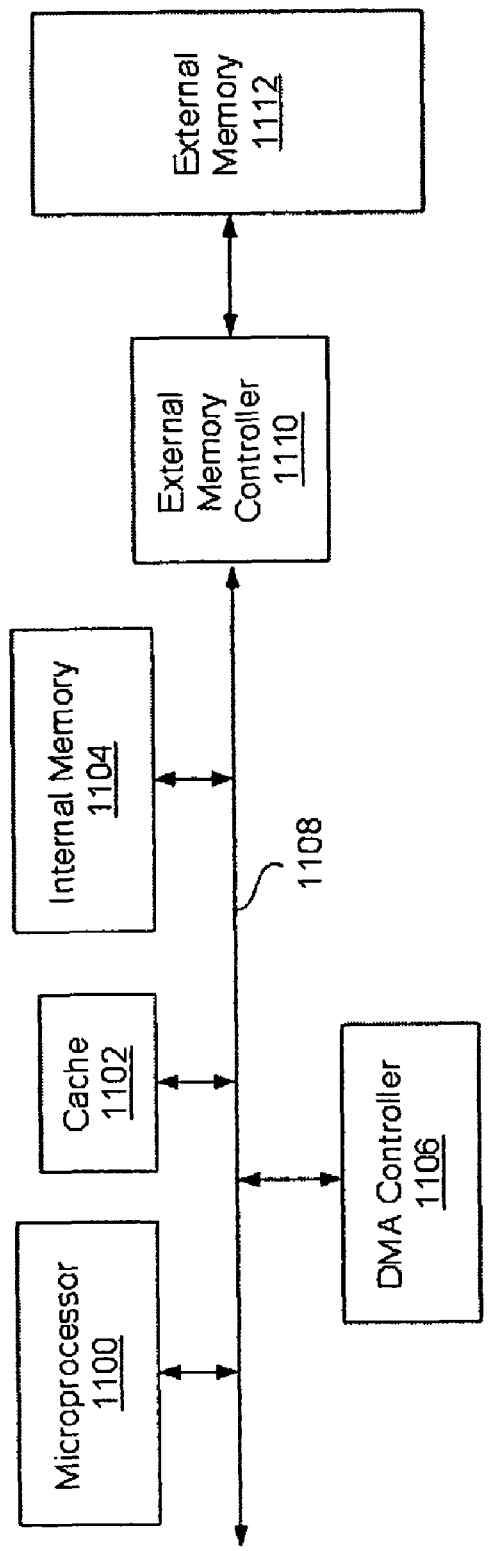
FIG. 11 is a block diagram of an exemplary computing device for implementing a method of motion estimation according to an embodiment of the invention.

FIG. 11 is a diagram of an exemplary computing device for implementing embodiments of the present invention. Such device may include, but not limited to, a microprocessor 1100, a cache memory 1102, an internal memory 1104, and a DMA controller 1106, interconnected by a system bus 1108.

TABLE 1

|  | FS | | TDL | | | | HS | | | | PGDS | | | |
| --- | --- | --- | --- | --- | --- | --- | --- | --- | --- | --- | --- | --- | --- | --- |
|  | avg bits | avg psnr | avg bits | avg psnr | % inc bits | psnr diff | avg bits | avg psnr | % inc bits | psnr diff | avg bits | avg psnr | % inc bits | psnr diff |
| foreman | 55917 | 34.44 | 74031 | 34.31 | 32.39 | −0.13 | 64012 | 34.27 | 14.48 | −0.17 | 55999 | 34.43 | 0.15 | −0.01 |
| paris | 63183 | 33.60 | 65029 | 33.60 | 2.92 | 0.00 | 64945 | 33.58 | 2.79 | −0.02 | 63374 | 33.61 | 0.30 | 0.01 |
| mobile | 303808 | 30.85 | 312959 | 30.85 | 3.01 | 0.00 | 309560 | 30.83 | 1.89 | −0.02 | 303489 | 30.85 | −0.11 | 0.00 |
| tennis | 207412 | 33.32 | 252728 | 33.50 | 21.85 | 0.18 | 209022 | 33.32 | 0.78 | 0.00 | 181397 | 33.3 | −12.5 | −0.02 |

Table 2 compares the implementation costs of five motion estimation algorithms, such as FS, TDL, HS, Predicted Search (PRED), and PGDS (according to embodiments of the invention), in terms of amount of allocated memory (in bytes), direct memory access (DMA) bandwidth per macroblock and number of search points. Different motion search ranges are shown, where a search having a range of size, for example, 16×16 pixels, is performed within a search window that encompasses 16 pixels in both vertical and horizontal directions, i.e., the search window is of size 32×32 pixels. According to Table 2, the amount of memory and DMA bandwidth required to perform PGDS is much less than those required to perform FS and TDL, given the same search range. At the same time, the performance of PGDS is very close to that of FS and exceeds performance of TDL.

In embodiments of the invention implemented using the computing device of FIG. 11, the system bus 1108 is connected to an external memory controller 1110 which controls an external memory 1112.

In addition, PGDS can be adapted to different embedded system architectures and meet different resource budgets. The algorithm can also be scaled for different frame sizes, which can range from CIF (352×288 pixels in the PAL system, 352×240 pixels in the NTSC system) to D1 (720×480 pixels in the NTSC system, 720×576 pixels in the PAL and SECAM systems) resolution standards, and high/low motion scenes. The execution delay of PGDS can be tuned dynamically during the run time to operate at different complexity levels. Thus, when a system workload is light, PGDS can perform a more intensive search to fully utilize system's

TABLE 2

|  |  | FS | | TDL | | HS | | PRED | | PGDS | |
| --- | --- | --- | --- | --- | --- | --- | --- | --- | --- | --- | --- |
| Search range | | 16 × 16 | 64 × 32 | 16 × 16 | 64 × 32 | 16 × 16 | 64 × 32 | 16 × 16 | 64 × 32 | 16 × 16 | 64 × 32 |
| memory (in bytes) | | 2800 | 12464 | 2800 | 12464 | 784 | 1360 | 616 | 616 | 1296 | 1872 |
| DMA/MB (in bytes) | | 1128 | 2206 | 1128 | 2206 | 696 | 752 | 616 | 616 | 1208 | 1264 |
| No of search points | 4 × 4 | NA | NA | NA | NA | 64 | 512 | NA | NA | 40 | 45 |
|  | 8 × 8 | NA | NA | NA | NA | 8 | 8 | NA | NA | NA | NA |
|  | 16 × 16 | 1024 | 8192 | 29~32 | 29~36 | 12 | 12 | 12~14 | 12~14 | 12~24 | 12~25 |

Embodiments of the present invention can be implemented in software, hardware, firmware, various types of processors, or as a combination thereof. Thus, embodiments may be implemented as computer-readable instructions embodied on one or more computer-readable media, including but not limited to storage media such as magnetic storage media (e.g., ROMs, RAMs, floppy disks), optically readable media (e.g., CD-ROMs DVDs, etc.), and carrier waves (e.g., transmission over the Internet). Some embodiments of the present invention can be implemented either as a computer-readable medium having stored thereon computer-readable instructions or as hardware components of various suitable computing devices, such as, for example, video encoders within high-performance members of the Blackfin family embedded digital signal processors available from Analog Devices, Inc., Norwood, Mass. For example, a digital signal processor ADSP-BF561, which includes two independent cores each capable of 600 MHz performance, and a single-core ADSP-BF533 digital signal processor that achieves up to 756 MHz performance may be utilized. Other various suitable digital signal processors can implement embodiments of the invention as well.

resources. During the time when the system workload is heavy, PGDS can operate with minimum delay in order to adhere to real-time scheduling requirements.

As should be appreciated from the foregoing, there are numerous aspects of the present invention described herein that can be used independently of one another or in any combination. In particular, various aspects of the present invention may be used alone, in combination, or in a variety of arrangements not specifically discussed in the embodiments described in the foregoing, and the aspects of the present invention described herein are not limited in their application to the details and arrangements of components set forth in the foregoing description or illustrated in the drawings. The aspects of the invention are capable of other embodiments and of being practiced or of being carried out in various ways. Various aspects of the present invention may be implemented using any type of circuit and no limitations are placed on the circuit implementation. Accordingly, the foregoing description and drawings are by way of example only.

It should also be appreciated that the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A method for motion estimation in a video sequence, comprising:
computing an adaptive cost threshold for a current macroblock in a current frame based at least in part on an average of encoding costs of all previously analyzed macroblocks in a search window in the current frame, wherein the adaptive cost threshold varies with the average of encoding costs of all previously analyzed macroblocks in the search window in the current frame;
selecting at least one macroblock neighboring the current macroblock having an encoding cost less than the adaptive cost threshold;
generating a predicted seed motion vector encoded using a predicted seed motion vector encoding cost based at least in part on a motion vector of the selected neighbor;
generating a hierarchical seed motion vector encoded using a hierarchical seed motion vector encoding cost;
selecting said predicted seed motion vector, said hierarchical seed motion vector, or both, based on a comparison of said predicted seed motion vector encoding cost and said hierarchical seed motion vector encoding cost for a full-pixel search;
performing said full-pixel search on each said selected seed motion vector to select a full-pixel motion vector based on an encoding cost of said full-pixel motion vector; and
performing a fractional pixel search using said selected full-pixel motion vector to estimate a final motion vector.

2. A method of claim 1, wherein said final motion vector is estimated for an input macroblock within a current video frame from said video sequence.

3. A method of claim 2, wherein said hierarchical seed vector is generated using a hierarchical search.

4. A method of claim 2, wherein generating said hierarchical seed vector includes decimating said input macroblock using a predetermined decimation factor and decimating a reference frame from said video sequence using said predetermined decimation factor.

5. A method of claim 2, wherein said full-pixel search is performed using at least one of said selected hierarchical seed motion vector or said selected predicted seed motion vector and wherein a number of full-pixel search locations is configurable.

6. A method of claim 2, wherein said full pixel search is a square search.

7. A method of claim 2, wherein said fractional pixel search includes at least one half-pixel square search and at least one quarter-pixel diamond search.

8. A method of claim 2, wherein said final motion vector is estimated within a search window of a configurable size.

9. A computer-readable, non-transitory storage medium encoded with computer instructions for execution on a computer system, the instructions, when executed, performing a method for motion estimation in a video sequence, comprising:
computing an adaptive cost threshold for a current macroblock in a current frame based at least in part on an average of encoding costs of all previously analyzed macroblocks in a search window in the current frame, wherein the adaptive cost threshold varies with the average of encoding costs of all previously analyzed macroblocks in the search window in the current frame;
selecting at least one macroblock neighboring the current macroblock having an encoding cost less than the adaptive cost threshold;
generating a predicted seed motion vector encoded using a predicted seed motion vector encoding cost based at least in part on a motion vector of the selected neighbor;
generating a hierarchical seed motion vector encoded using a hierarchical seed motion vector encoding cost;
selecting said predicted seed motion vector, said hierarchical seed motion vector, or both, based on a comparison of said predicted seed motion vector encoding cost and said hierarchical seed motion vector encoding cost for a full-pixel search;
performing said full-pixel search on each said selected seed motion vector to select a full-pixel motion vector based on an encoding cost of said full-pixel motion vector; and
performing a fractional pixel search using said selected full-pixel motion vector to estimate a final motion vector.

10. A computer-readable, non-transitory storage medium of claim 9, wherein said final motion vector is estimated for an input macroblock within a current video frame from said video sequence.

11. A computer-readable, non-transitory storage medium of claim 10, wherein said hierarchical seed vector is generated using a hierarchical search.

12. A computer-readable, non-transitory storage medium of claim 10, wherein generating said hierarchical seed vector includes decimating said input macroblock using a predetermined decimation factor and decimating a reference frame from said video sequence using said predetermined decimation factor.

13. A computer-readable, non-transitory storage medium of claim 10, wherein said full-pixel search is performed using at least one of said selected hierarchical seed motion vector or said selected predicted seed motion vector and wherein a number of full-pixel search locations is configurable.

14. A computer-readable, non-transitory storage medium of claim 10, wherein said full pixel search is a square search.

15. A computer-readable, non-transitory storage medium of claim 10, wherein said fractional pixel search includes at least one half-pixel square search and at least one quarter-pixel diamond search.

16. A computer-readable, non-transitory storage medium of claim 10, wherein said final motion vector is estimated within a search window of a configurable size.

17. An apparatus comprising a processor and a computer-readable storage medium containing computer instructions for execution on the processor to provide a method for a motion estimation in a video sequence, comprising:
computing an adaptive cost threshold for a current macroblock in a current frame based at least in part on an average of encoding costs of all previously analyzed macroblocks in a search window in the current frame, wherein the adaptive cost threshold varies with the average of encoding costs of all previously analyzed macroblocks in the search window in the current frame;
selecting at least one macroblock neighboring the current macroblock having an encoding cost less than the adaptive cost threshold;
generating a predicted seed motion vector encoded using a predicted seed motion vector encoding cost based at least in part on a motion vector of the selected neighbor;

generating a hierarchical seed motion vector encoded using a hierarchical seed motion vector encoding cost;

selecting said predicted seed motion vector, said hierarchical seed motion vector, or both, based on a comparison of said predicted seed motion vector encoding cost and said hierarchical seed motion vector encoding cost for a full-pixel search;

performing said full-pixel search on each said selected seed motion vector to select a full-pixel motion vector based on an encoding cost of said full-pixel motion vector; and performing a fractional pixel search using said selected full-pixel motion vector to estimate a final motion vector.

18. An apparatus of claim 17, wherein said final motion vector is estimated for an input macroblock within a current video frame from said video sequence.

19. An apparatus of claim 18, wherein said hierarchical seed vector is generated using a hierarchical search.

20. An apparatus of claim 18, wherein generating said hierarchical seed vector includes decimating said input macroblock using a predetermined decimation factor and decimating a reference frame from said video sequence using said predetermined decimation factor.

21. An apparatus of claim 18, wherein said full-pixel search is performed using at least one of said selected hierarchical seed motion vector or said selected predicted seed motion vector and wherein a number of full-pixel search locations is configurable.

22. An apparatus of claim 18, wherein said full pixel search is a square search.

23. An apparatus of claim 18, wherein said fractional pixel search includes at least one half-pixel square search and at least one quarter-pixel diamond search.

24. An apparatus of claim 18, wherein said final motion vector is estimated within a search window of a configurable size.

25. A method of claim 1, wherein the encoding cost comprises (i) differences between a macroblock in the current frame and a co-located macroblock in a reference frame and (ii) a motion vector encoding cost of the macroblock.

26. A computer-readable, non-transitory storage medium of claim 9, wherein the encoding cost comprises (i) differences between a macroblock in the current frame and a co-located macroblock in a reference frame and (ii) a motion vector encoding cost of the macroblock.

27. An apparatus of claim 17, wherein the encoding cost comprises (i) differences between a macroblock in the current frame and a co-located macroblock in a reference frame and (ii) a motion vector encoding cost of the macroblock.

28. A method of claim 1, wherein the selected at least one macroblock comprises a first number of macroblocks that is less than a second number of macroblocks neighboring the current macroblock.

29. A computer-readable, non-transitory storage medium of claim 9, wherein the selected at least one macroblock comprises a first number of macroblocks that is less than a second number of macroblocks neighboring the current macroblock.

30. An apparatus of claim 17, wherein the selected at least one macroblock comprises a first number of macroblocks that is less than a second number of macroblocks neighboring the current macroblock.

* * * * *